United States Patent
Eldridge

(10) Patent No.: US 7,880,912 B2
(45) Date of Patent: Feb. 1, 2011

(54) NETWORK PRINTING SYSTEM HAVING AUTOMATED SELECTION OF A DESTINATION PRINTER

(75) Inventor: George L. Eldridge, Long Beach, CA (US)

(73) Assignee: Xerox Corporation, Stamford, CT (US)

( * ) Notice: Subject to any disclaimer, the term of this patent is extended or adjusted under 35 U.S.C. 154(b) by 1018 days.

(21) Appl. No.: 11/296,014

(22) Filed: Dec. 7, 2005

(65) Prior Publication Data

US 2007/0127058 A1 Jun. 7, 2007

(51) Int. Cl.
*G06F 3/12* (2006.01)
*G03G 21/02* (2006.01)

(52) U.S. Cl. .................... 358/1.15; 399/79
(58) Field of Classification Search ............ 358/1.15; 399/79
See application file for complete search history.

(56) References Cited

U.S. PATENT DOCUMENTS

| 6,864,878 | B2 | 3/2005 | Stohrer et al. | |
|---|---|---|---|---|
| 7,184,032 | B2 | 2/2007 | Stohrer et al. | |
| 7,475,249 | B2 | 1/2009 | Gaucas et al. | |
| 7,505,180 | B2 | 3/2009 | DeYoung et al. | |
| 7,526,812 | B2 | 4/2009 | DeYoung | |
| 7,721,099 | B2 | 5/2010 | DeYoung et al. | |
| 2003/0011805 | A1* | 1/2003 | Yacoub .................. | 358/1.15 |
| 2003/0142334 | A1* | 7/2003 | Currans et al. ............ | 358/1.13 |
| 2003/0184524 | A1 | 10/2003 | Stohrer et al. | |
| 2004/0150850 | A1* | 8/2004 | Hanamoto ................. | 358/1.9 |
| 2005/0030296 | A1 | 2/2005 | Stohrer et al. | |
| 2005/0195231 | A1* | 9/2005 | Kasamatsu ................. | 347/14 |
| 2006/0218643 | A1 | 9/2006 | DeYoung | |
| 2006/0238799 | A1* | 10/2006 | Kidokoro ................ | 358/1.15 |
| 2006/0265590 | A1 | 11/2006 | DeYoung et al. | |
| 2006/0271787 | A1 | 11/2006 | DeYoung et al. | |
| 2007/0030970 | A1 | 2/2007 | DeYoung et al. | |
| 2007/0110339 | A1 | 5/2007 | DeYoung et al. | |
| 2007/0136588 | A1 | 6/2007 | DeYoung et al. | |
| 2007/0139692 | A1 | 6/2007 | Martin et al. | |
| 2008/0192105 | A1 | 8/2008 | Sembower et al. | |
| 2010/0075290 | A1 | 3/2010 | DeYoung et al. | |
| 2010/0075291 | A1 | 3/2010 | DeYoung et al. | |
| 2010/0075292 | A1 | 3/2010 | DeYoung et al. | |

* cited by examiner

*Primary Examiner*—Twyler L Haskins
*Assistant Examiner*—Fred Guillermety
(74) *Attorney, Agent, or Firm*—Carter, DeLuca, Farrell & Schmidt, LLP

(57) ABSTRACT

A network printing system is provided having a plurality of network printers, a plurality of computer terminals, and at least one processor in operative communication with the plurality of printers and the plurality of computer terminals. The at least one processor executes application software for receiving a print data request having a print job from at least one of the plurality of computer terminals. The at least one processor includes an automated selection service module for analyzing printer-related data corresponding to each of the plurality of printers, selecting at least one of the plurality of printers in accordance with the analysis and transmitting the print data request to the at least one selected destination printer. The at least one processor further includes a printer notification module for generating and transmitting a notification message to a user specifying the at least one selected destination printer.

15 Claims, 3 Drawing Sheets

NETWORK PRINTING SYSTEM HAVING AUTOMATED SELECTION OF A DESTINATION PRINTER

BACKGROUND

The present disclosure relates generally to network printing systems. In particular, the present disclosure relates to a network printing system having automated selection of a destination printer.

A network printing system is a system that connects one or more user terminals (e.g., personal computer) with a plurality of printers via a network, such as, for example, WAN and LAN. The plurality of printers include fixed characteristics, such as, for example, physical location and print rate; and time varying characteristics, such as, for example, color gamut and available paper stock.

In general, the user terminal transmits a print data request to a particular printer via the network. Prior to transmitting the print data request, the user selects a desired printer from the plurality of printers taking into consideration the fixed characteristics of the selected printer. Accordingly, printing to the selected printer may result in user dissatisfaction, such as, for example, when the color gamut or other time varying characteristics of the printer have changed and/or do not meet the user's quality expectations. Moreover, if, for example, the desired printer is located at some distance from the user, the user will discover that the print quality does not meet the user's quality requirements until the user has traveled to the printer to pick up the finished print job. This inconvenience leads to loss of time and, therefore, loss in productivity. Situations such as these also result in a loss of resources, such as, for example, paper and toner, since the user will most likely reprint the print job using a different printer of the plurality of printers.

In another typical scenario, the user may need a print job without delay but is unaware that the desired printer is processing, for instance, a very large print job, e.g. printing a large document and/or a large number of copies of a document. Thus the user, unknowingly, sends a print data request to the printer, resulting in a delay of his print job.

To overcome the drawbacks in the prior art, it is an aspect of the present disclosure to provide a network printing system having at least one processor which analyzes printer-related data corresponding to each of a plurality of network printers, automatically selects at least one destination printer from the plurality of printers in accordance with the analysis, and notifies the user of the selected destination printer.

SUMMARY

The present disclosure is directed to a network printing system having a plurality of network printers, a plurality of computer terminals, and at least one processor in operative communication with the plurality of printers and the plurality of computer terminals. The at least one processor executes application software for receiving a print data request having a print job from at least one of the plurality of computer terminals. The at least one processor includes an automated selection service module for analyzing printer-related data corresponding to each of the plurality of printers, selecting at least one of the plurality of printers in accordance with the analysis, and transmitting the print data request to the at least one selected destination printer. The processor further includes a printer notification module for generating and transmitting a notification message specifying the at least one selected destination printer.

The present disclosure is also directed to a processor having an automated selection service module for automatically analyzing printer-related data corresponding to each of a plurality of network printers, selecting at least one of the plurality of network printers in accordance with the analysis, and transmitting the print data request to the at least one selected network printer of the plurality of network printers. The processor further includes a printer notification module for generating and transmitting a notification message to a computer terminal specifying the at least one selected network printer.

The present disclosure is also directed to a method for routing a print data request in a network printing system. The method includes receiving the print data request by at least one processor via a network connection from a computer terminal; analyzing printer-related data corresponding to each of a plurality of network printers; automatically selecting at least one network printer of the plurality of network printers in accordance with the analysis; and routing the print data request to the at least one selected network printer of the plurality of network printers. The method also includes generating and transmitting a notification message to the computer terminal specifying the at least one selected network printer.

Other features of the presently disclosed network printing system will become apparent from the following detailed description, taken in conjunction with the accompanying drawings, which illustrate, by way of example, the presently disclosed network printing system.

BRIEF DESCRIPTION OF THE DRAWINGS

Various embodiments of the present disclosure will be described below with reference to the figures, wherein.

DETAILED DESCRIPTION

Figure 1A:
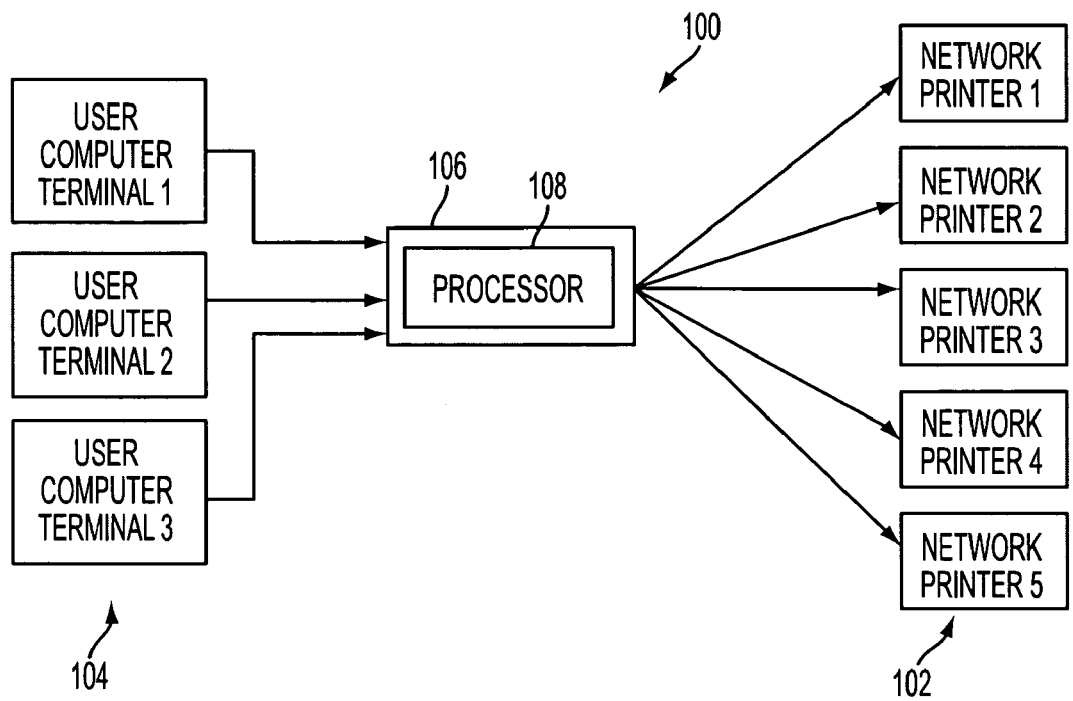
FIG. 1A is a schematic illustration of an exemplary network printing system in accordance with the present disclosure.

Referring now to the drawing figures, in which like references numerals identify identical or corresponding elements, the network printing system and method in accordance with the present disclosure will now be described in detail. With initial reference to FIG. 1A, an exemplary network printing system in accordance with the present disclosure is illustrated and is designated generally as network printing system 100. Network printing system 100 includes a plurality of network printers 102, a plurality of user computer terminals 104 and a universal printer server 106 in operative communication with the plurality of network printers 102 and the plurality of computer terminals 104.

The word "printer" as used herein encompasses any apparatus or system, such as a digital copier, xerographic printing system, reprographic printing system, bookmaking machine, facsimile machine, multifunction machine, etc., which performs a print outputting function for any purpose.

The universal printer server 106 includes at least one processor 108 capable of executing application software for receiving print data requests from the plurality of computer terminals 104, automatically selecting destination network printers for routing the print data requests, and generating and transmitting messages to the plurality of computer terminals 104 specifying the selected destination printers as described in detail herein below.

Each of the plurality of computer terminals 104 can be any computing device capable of being integrated within a network, such as a PDA, personal computer, cellular telephone, point-of-sale terminal, server, etc. Each of the plurality of network printers 102 may include, for example, (listed in order from highest to lowest) input spoolers, raster image processors ("RIPs"), output spoolers and print engines. The plurality of network printers 102 may be located remotely with respect to each other, or alternatively, they may be located locally with respect to each other, such as, for example, at a print shop or in an office environment.

Figure 1B:
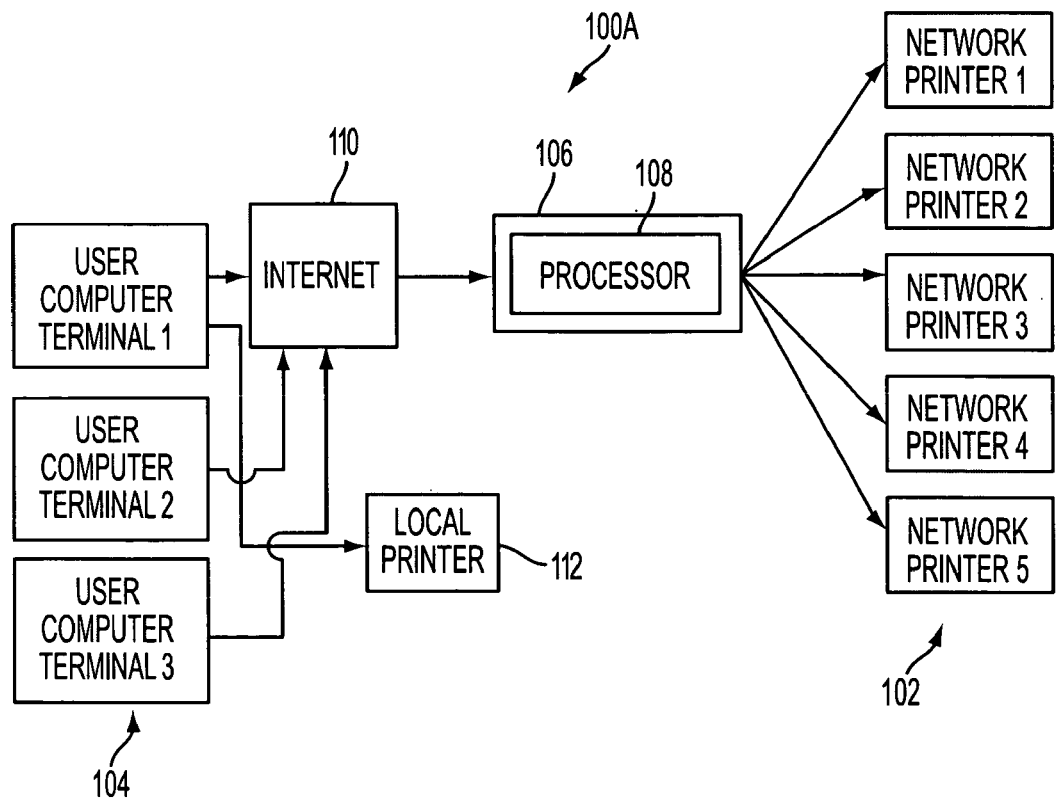
FIG. 1B is a schematic illustration of a second embodiment of the network printing system in accordance with the present disclosure.

Those skilled in the art will envision various configurations for the network printing system 100. For example, with reference to FIG. 1B, there is shown a network printing system 100A with the plurality of user computer terminals 104 in operative communication with the universal printer server 106 and the at least one processor 108 via a communications medium, such as, for example the internet 110. In the network printing system 100A, a first user computer terminal 104 is in operative communication with the plurality of network printers 102 via the Internet 110 and a local printer 112.

Figure 2:
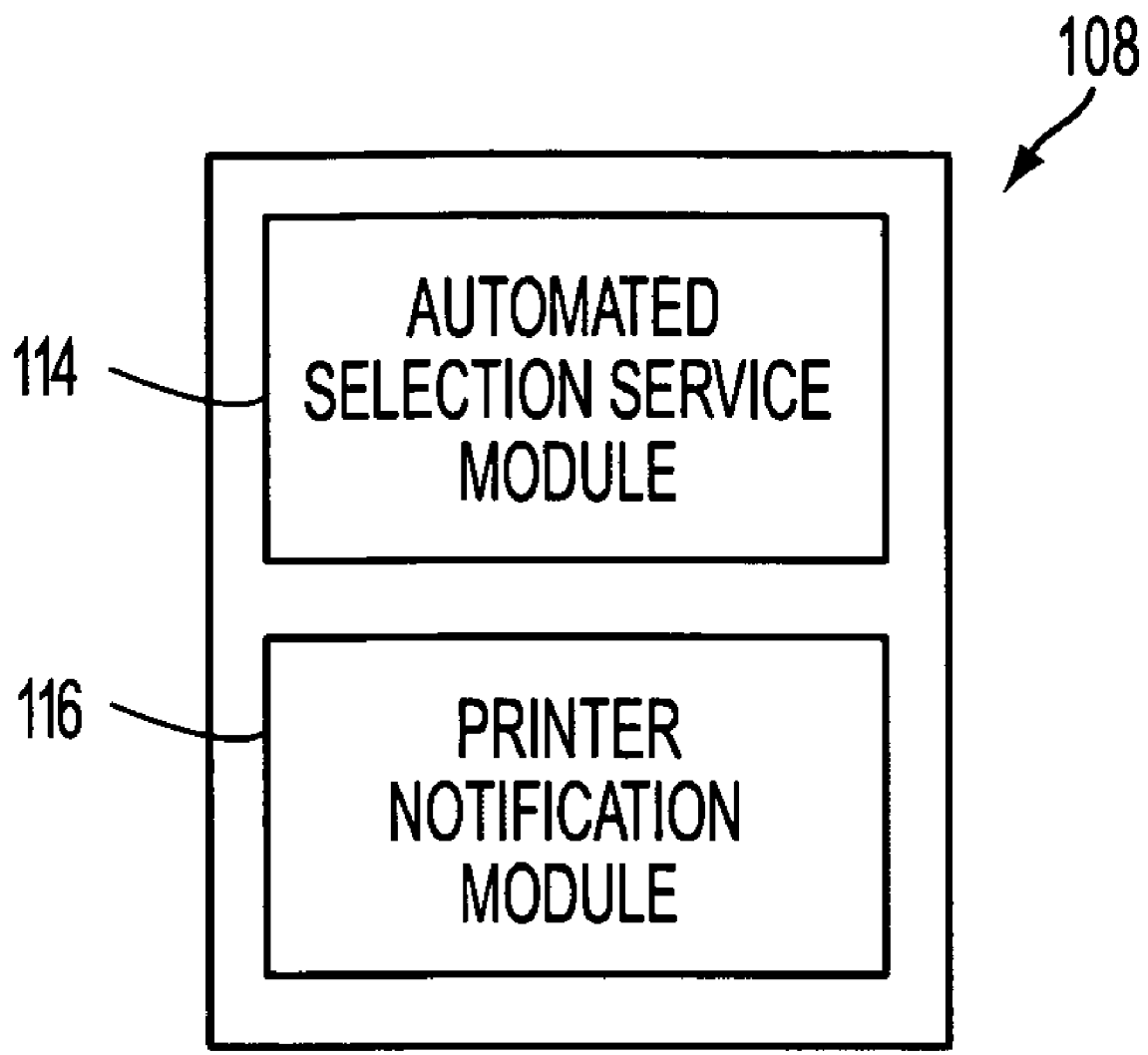
FIG. 2 is a schematic block diagram of a processor and corresponding modules of the network printing system in accordance with the present disclosure.
Figure 3:
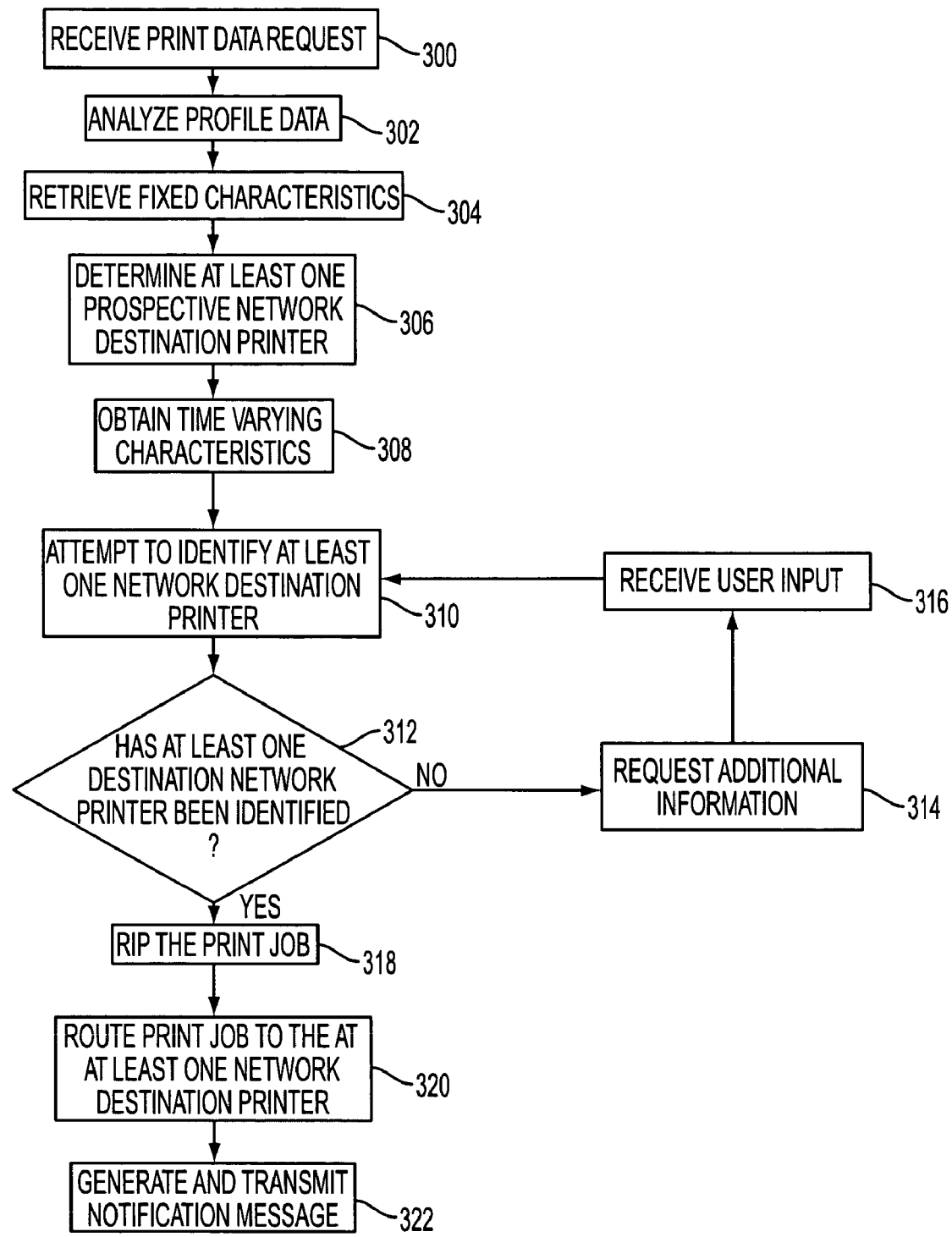
FIG. 3 is a flow chart illustrating a method for selecting at least one destination network printer and for routing a print data request to the selected destination network printer, as well as notifying a user of the selected destination network printer in accordance with the present disclosure.

With reference to FIGS. 2 and 3, the operation of the at least one processor 108 for performing the functions in accordance with the present disclosure will now be discussed in detail. The at least one processor 108 is operatively connected to each user computer terminal 104 for receiving a print data request and routing the print data request to at least one of the plurality of network printers 102 capable of optimally satisfying the print data request. The print data request has at least one print job and profile data which sets forth user-desired printing parameters (page range, number of copies, finishing requirements, paper quality, paper size, color or gray-scale printing, page setup, portrait or landscape orientation, fonts, etc.) for performing the at least one print job.

As shown by FIG. 2, the at least one processor 108 includes an automated selection service module 114 and a printer notification module 116. The automated selection service module 114 includes a set of programmable instructions capable of being executed by the at least one processor 108 for analyzing the profile data of the print data request received from the user computer terminal 104, analyzing printer-related data corresponding to each of the plurality of network printers 102, selecting at least one of the plurality of network printers 102 capable of optimally satisfying a print job of the print data request, and transmitting the print data request to the at least one selected network printer of the plurality of network printers 102. The automated selection service module 114 further raster image processes the print job of the print data request prior to transmitting the print data request to the at least one selected network printer 102.

The printer-related data includes, for example, fixed and time varying characteristics corresponding to each of the plurality of network printers 102. The fixed characteristics include but are not limited to a printer's physical location, image resolution, print rate, toner colorants, user registration (whether the user is authorized to use the network printer), halftone screens, page size limitations, finishing options (collate, staple, etc.), and cost per page. The time varying characteristics include but are not limited to a printer's color gamut, tone reproduction curve, image quality, available paper stock, and estimated job completion time.

The printer notification module 116 includes a set of programmable instructions capable of being executed by the at least one processor 108 for generating and transmitting a notification message to the user specifying the at least one selected destination network printer. The notification message may include but is not limited to an email message, a pop-up window, an instant message, a page, and a telephone call. The notification message may include the fixed and/or time varying characteristics of the at least one selected destination network printer.

With reference to FIG. 3, there is shown a flow chart illustrating a method for selecting at least one destination network printer and for routing a print data request to the selected destination network printer, as well as notifying a user of the selected destination network printer in accordance with the present disclosure. Initially, the at least one processor 108 at Step 300 receives the print data request from a user computer terminal 104. As described above, the print data request includes profile data which sets forth user-desired printing parameters (page range, number of copies, finishing requirements, paper quality, paper size, color or gray-scale printing, page setup, portrait or landscape orientation, fonts, etc.) for performing at least one print job. At step 302, the at least one processor 108 analyzes the profile data.

The at least one processor 108 begins execution of the set of programmable instructions of the automated selection service module 114. At Step 304, the automated selection service module 114 retrieves from a memory of the at least one processor 108 printer-related data, and specifically the fixed characteristics corresponding to each of the plurality of network printers 102. As stated above, the fixed characteristics include but are not limited to a printer's physical location, image resolution, print rate, toner colorants, user registration (whether the user is authorized to use the network printer), halftone screens, page size limitations, finishing options (collate, staple, etc.), and cost per page.

At Step 306, the automated selection service module 114 determines at least one prospective destination network printer 102. The at least one prospective destination network printer 102 is determined by the at least one processor 108 comparing the one or more fixed characteristics for each network printer 102 with the profile data and determining at least one network printer 102 whose corresponding fixed characteristics closely match the profile data.

Alternatively, the automated selection service module 114 analyzes the one or more fixed characteristics according to a pre-programmed prioritization list for determining the at least one prospective destination network printer 102. For example, the prioritization list can be the following:

1. User Registration: Determine which network printers 102 the user computer terminal 104 which transmitted the print data request is authorized to send print data requests to;

2. Image resolution, toner colorants, and halftone screens: Determine which of the remaining network printers 102 would optimally satisfy the profile data of the print data request according to these fixed characteristics (i.e., which of the remaining network printers 102 can most optimally reproduce or print the document with the specified image resolution, color scheme, and halftone screens);

3. Minimum cost per page: Determine which of the remaining network printers 102 provides the minimum cost per page;

4. Printer's location: Determine which of the remaining network printers 102 is located closest to the user computer terminal 104 which transmitted the print data request; and 5. Print rate: Determine whether the document to be reproduced or printed is greater than 200 pages, and if yes, determine which of the remaining network printers 102 has a print rate of 25 pages or more per minute.

The network printer(s) 102 that meets all the conditions as set forth by the prioritization list is earmarked by the at least one processor 108 as a prospective destination network printer(s) for routing the print data request and performing the respective print job of the print data request. It is contemplated that if there are no remaining network printers 102 following prioritization item number five, the at least one processor 108 backtracks to prioritization item number four and selects the at least one network printer 102 identified after this prioritization item.

At Step 308, the automated selection service module 114 obtains printer-related data, and specifically the time varying characteristics corresponding to each of the plurality of network printers 102. As stated above, the time varying characteristics include but are not limited to a printer's color gamut, tone reproduction curve, image quality, available paper stock, and estimated job completion time. The time varying characteristics are obtained by the at least one processor 108 interrogating a respective processor of each of the plurality of network printers 102 storing the time varying characteristics via respective network connections. The at least one processor 108 communicates with each respective processor via a communications protocol, such as TCP/IP.

It is contemplated that the fixed characteristics are stored in the plurality of network printers 102 rather than within a memory of the at least one processor 108 and are obtained using the methodology for obtaining the time varying characteristics.

At Step 310, the automated selection service module 114 attempts to identify at least one network destination printer 102 for routing the print data request. The at least one network destination printer 102 is selected by the at least one processor 108 from the one or more network printers 102 identified at Step 306. The at least one processor 108 selects at least one network destination printer 102 whose time varying characteristics would enable the print job of the print data request to be optimally satisfied. The at least one processor 108 can also use the additional information obtained in Step 314, as described below, in selecting the at least one network destination printer 102.

For example, the at least one processor 108 selects the at least one network destination printer 102 after the at least one processor 108 determines, for example, that the at least one network destination printer 102 would print a document that substantially matches the document's electronic version as displayed by a display of a user computer terminal 104; that the at least one network destination printer 102 has adequate paper stock for performing the print job; and that the at least one network destination printer 102 would be able to complete the print job within a given time period as pre-programmed within the at least one processor 108, for example, within five minutes.

At Step 312, the automated selection service module 114 determines whether at least one destination network printer 102 was identified in Step 310. If yes, the process proceeds to Step 318 as described below. If no, the process proceeds to Step 314. At Step 314, the automated selection service module 114 requests additional information from the user. As such, the at least one processor 108 poses to the user via the user's computer terminal 104 one or more questions. For example, the at least one processor 108 queries the user to determine if the user does not mind if the print job is completed in more than five minutes; if the print job can be performed with a different image resolution than the image resolution requested by the print data request; if the print job can be performed by a network printer 102 which is located off premises; etc.

In an alternate embodiment, the automated selection service module 114 proposes two or more printing scenarios to the user and requests the user to select one of the printing scenarios. For example, the at least one processor 108 can propose the following three printing scenarios at Step 314: 1) print half the document with the printer identified as RED which is 20 feet away from the user and which does not have a stapling feature and will therefore, not staple the finished document, and print the other half of the document with the printer identified as GREEN which is 25 feet away from the user and which cannot print the color features of the document in color; 2) print the document with the printer identified as BLUE which is 30 feet away from the user and which has been identified as optimally performing the print job, but will not be able to complete the print job for at least 15 minutes; and 3) print the document with the printer identified as YELLOW which is 200 feet away from the user and which has also been identified as optimally performing the print job.

At Step 316, the automated selection service module 114 receives the user input to the one or more questions via a network connection and uses the additional information at Step 310 for reattempting to identify at least one destination network printer 102. The loop which includes Steps 310, 312, 314 and 316 can be repeated several times with different questions be posed to the user until the at least one processor 108 has adequate information to identify at least one destination network printer 102.

At Step 318, the automated selection service module 114 raster image processes (RIPs) the print job. It is contemplated that the at least one processor 108 routes the print data request having the print job to another processor, such as a RIP processor, for raster image processing the print job. The raster image processed print job is then routed to the at least one destination network printer 102 at Step 320 by the at least one processor 108 or the RIP processor according to routing instructions received by the at least one processor 108.

If the automated selection service module 114 identifies more than one destination network printer 102 at Step 310, it is contemplated that at least one of the fixed characteristic of the two or more identified destination network printers 102 are analyzed by the automated selection service module 114 and one printer 102 is selected from the identified printers 102. For example, cost per page could be analyzed to determine cost implications between using one printer 102 to perform the print job over another, and selecting the printer with the lower cost.

Furthermore, if the automated selection service module 114 identifies or selects more than one destination network printer 102 at Step 310, it is contemplated that prior to routing the raster image processed print job to a network printer 102, the at least one processor 108 presents the user with the identified network printers 102 and respective printing scenarios (cost implications between selecting one printer over the other, location of printers, etc.) and prompts the user to select one of the identified network printers 102. Accordingly, the user confirms one of the network printers 102 identified or selected by the automated selection service module 114.

In the alternative embodiment described above with reference to Step 314, after the selection of a printing scenario is made in Step 314, the user knows which network printer(s) 102 will perform the print job and therefore, the process ends after Step 320.

At Step 322, the at least one processor 108 executes the set of programmable instructions of the notification service module 114 for generating and transmitting a notification message to a user specifying the at least one selected destination network printer 102. The notification message can be one or more of the following: an email message, a pop-up window, an instant message, a page, and a telephone call.

The following examples illustrate the method of routing a print data request to at least one destination network printer 102 in the network printing system 100 in accordance with the present disclosure. It is noted that the following examples are not intended to limit the disclosure, but are included for illustrative purposes. Table 1 indicates a sample of the fixed characteristics of each of the plurality of network printers 102 of the network printing system 100.

TABLE 1

| Network Printers | Print Rate (Pages per Minute) | Color/ Monochrome And Toner Colorants | User Authorization | Image Resolution (dots per inch) | Cost per page | Page Size Limitations | Location (feet from user's terminal) |
|---|---|---|---|---|---|---|---|
| Printer 1 | 80 | Color Xerographic | Yes | 600 × 600 | $0.03 | Letter Legal | 500 |
| Printer 2 | 40 | Color Solid Ink | Yes | 1200 × 1200 | $0.06 | Letter Legal A4 Envelope Postcard | 100 |
| Printer 3 | 50 | Monochrome Xerographic | No | 1200 × 1200 | $0.01 | Letter | 200 |
| Printer 4 | 60 | Monochrome Xerographic | Yes | 600 × 600 | $0.01 | Letter Legal | 10 |
| Printer 5 | 100 | Color Xerographic | No | 1200 × 1200 | $0.02 | Letter Legal A4 Envelope | 250 |

EXAMPLE 1

A user desires to print a draft of a ten-page color presentation. The user sends the print job via a print data request to the at least one processor 108 of the universal print server 106, where the profile data of the print data request, among other things, specifies "draft" and "color." Upon receiving the print data request, the at least one processor 108 executes the automated selection service module 114 and compares the fixed characteristics of network printers 1, 2 and 4 with the profile data of the print data request. The fixed characteristics of network printers 3 and 5 are not considered since the user is not authorized to use these network printers 102.

The automated selection service module 114 then selects network Printers 1 and 2 as prospective destination printers for the print job. These printers 102 are selected because they have fixed characteristics which substantially match the profile data of the print data request (i.e., these printers can print color documents). Printer 4 is a monochrome printer and is therefore excluded as a possible destination printer 102 for the print job. Printer 1 is determined to be a more preferable printer to perform the print job since the cost per page is less than the cost per page for printer 2.

The automated selection service module 114 then interrogates printers 1 and 2 to obtain their corresponding time varying characteristics. The time varying characteristics are then analyzed and it is determined either printer 1 or 2 can perform the print job in a manner which will optimally satisfy the user. The difference between the two printers 1 and 2 is the type of toner/colorant that they use. Printer 1 uses toner and printer 2 uses solid ink. Another difference between the two printers 1 and 2 is that the estimated completion time for printer 1 is fifteen minutes whereas the estimated completion time for printer 2 is five minutes. The automated selection service module 114, nonetheless, selects printer 1 to perform the print job after taking into consideration that the cost per page for printer 1 is less than the cost per page for printer 2. Accordingly, the automated selection service module 114 routes the print job to a RIP processor for raster image processing the print job. The raster image processed print job is then routed from the RIP processor to printer 1.

It is contemplated that, alternatively, the at least one processor 108 presents the user with the two printing scenarios involving printers 1 and 2 and the respective cost implications, and allows for the user to select which printer he wants the print job to be routed to.

The printer notification module 116 then generates and transmits a notification message which is routed to the user computer terminal 104 corresponding to the user. The notification message specifies that printer 1 was selected for performing the print job. The notification message also indicates that the print job will be completed in fifteen minutes and/or the location of printer 1.

EXAMPLE 2

A user completes proofing a ten-page color presentation and sends a print data request to the at least one processor 108 having profile data specifying "highest color quality." The automated selection service module 114 compares the fixed characteristics of each of printers 1 through 5 with the profile data. The at least one processor 108 selects Printers 2 and 5 as the printers 102 capable of optimally satisfying the print data request.

The automated selection service module 114 then accesses the time varying characteristics of network printers 2 and 5 and determines that the color gamut of network printer 5 is temporarily limited because a developer housing of network printer 5 requires cleaning. The automated selection service module 114 therefore selects network printer 2 for performing the print job and presents this choice to the user for confirmation.

If the user is willing to pay the additional cost to get the best image quality, the user confirms the selection. The at least one processor 108 then routes the print data request to the RIP processor which raster image processes the print job. The raster image processed print job is then routed to network printer 2 for printing. The at least one processor 108 then executes the printer notification module 116 which generates and transmits a notification message to the user that the print data request has been sent to network printer 2. Alternatively, the printer notification module is not executed since the user knows which network printer 2 has been selected to perform the print job.

EXAMPLE 3

If the user in the previous example now requires additional copies of the ten-page color presentation, the user transmits another print data request to the at least one processor 108 specifying "highest color quality." The at least one processor 108 executes the automated selection service module 114 and compares the fixed characteristics of each of the network printers 1 through 5. The automated selection service module 108 selects network printers 2 and 5 as the printers capable of optimally satisfying the print data request.

The at least one processor 108 then accesses the time varying characteristics of network printers 2 and 5 and determines that the color gamut of network printer 5 is still temporarily limited because the developer housing has not been cleaned. The automated selection service module 114 therefore selects network printer 2 for performing the print job and presents this choice to the user for confirmation.

This time the user does not want to pay the higher cost involved in printing the ten-page color presentation using network printer 2 and therefore declines. The automated selection service module 114 then selects network printer 5 with the option to wait until the developer housing of network printer 5 is cleaned before having the print job performed. Accordingly, the at least one processor 108 routes the print data request to the RIP processor which raster image processes the print data request and routes the raster image processed print data request to network printer 5 for printing. Network printer 5 stores the print data request within a buffer until the developer housing is cleaned before performing the print job.

When the full color gamut of network printer 5 has been restored, network printer 5 performs and completes the print job. Subsequently, network printer 5 communicates to the at least one processor 108 that the print job has been completed. The at least one processor 108 then executes the printer notification module 116 for generating and transmitting a notification message to the user that the print job has been completed by network printer 5.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A network printing system, comprising:
a plurality of network printers;
a plurality of computer terminals; and
at least one processor in operative communication with the plurality of printers and the plurality of computer terminals, wherein the at least one processor executes application software for receiving a print data request having a print job from at least one of the plurality of computer terminals, the at least one processor comprising:
an automated selection service module for analyzing printer-related data corresponding to each of the plurality of printers, determining a group consisting of at least one prospective network destination printer from the plurality of printers in accordance with a first analysis using at least a portion of the printer-related data, attempting to select at least one of the plurality of printers from the group of the at least one prospective network destination printer in accordance with a second analysis using at least another portion of the printer-related data different from the portion of the printer-related data used for the first analysis, determining if at least one of the plurality of printers was selected as at least one destination printer, and transmitting the print data request to the at least one selected destination printer if a selection of the at least one destination printer has been made;
wherein the printer-related data corresponding to each of the plurality of network printers includes fixed characteristics and time varying characteristics,
wherein the fixed characteristics are cost per page and one of toner colorants and halftone screens used during the first analysis,
wherein the time varying characteristics are one of color gamut and tone reproduction curve used during the second analysis,
wherein the automated selection service module further proposes at least two printing scenarios and requests a user to select one of the at least two printing scenarios, and
wherein the at least two printing scenarios include at least two printing scenarios selected from the group consisting of: a printing scenario for performing the print job by printing at least a portion of a document with a first printer and printing at least another portion of the document with a second printer; a printing scenario for performing the print job using a third printer but not being able to complete the print job for a specified period of time; and a printing scenario for performing the print job using a fourth printer located at a certain distance from the user.

2. The network printing system as recited in claim 1, wherein the at least one processor performs raster image processing on the print job prior to transmitting the print data request to the at least one selected destination printer.

3. The network printing system as recited in claim 1, wherein the at least one processor further comprises a printer notification module for generating and transmitting a notification message to a user specifying the at least one selected destination printer.

4. The network printing system as recited in claim 3, wherein the notification message is selected from the group consisting of an email message, a pop-up window, an instant message, a page, and a telephone call.

5. The network printing system as recited in claim 1, wherein the automated selection service module receives a confirmation of one printer of the at least one selected destination printer prior to transmitting the print data request.

6. The network printing system as recited in claim 1, wherein the automated selection service module analyzes the printer-related data in accordance with a prioritization list.

7. The network printing system as recited in claim 1, wherein the automated selection service module requests user input, and wherein the automated selection service module uses the user input during the analysis.

8. A computer-readable medium storing a series of programmable instructions configured for execution by at least one processor, comprising:
  an automated selection service module for automatically analyzing printer-related data corresponding to each of a plurality of network printers,
  determining a group consisting of at least one prospective network printer from the plurality of network printers in accordance with a first analysis using at least a portion of the printer-related data, attempting to select at least one of the plurality of network printers from the group of the at least one prospective network printer in accordance with a second analysis using at least another portion of the printer-related data different from the portion of the printer-related data used for the first analysis, determining if at least one of the plurality of network printers was selected as at least one network printer, and transmitting the print data request to the at least one selected network printer of the plurality of network printers if a selection of the at least one network printer has been made; and
  a printer notification module for generating and transmitting a notification message to a computer terminal specifying the at least one selected network printer;
  wherein the printer-related data corresponding to each of the plurality of network printers includes fixed characteristics and time varying characteristics,
  wherein the fixed characteristics are cost per page and one of toner colorants and halftone screens used during the first analysis,
  wherein the time varying characteristics are one of color gamut and tone reproduction curve used during the second analysis,
  wherein the automated selection service module further proposes at least two printing scenarios and requests a user to select one of the at least two printing scenarios, and
  wherein the at least two printing scenarios include at least two printing scenarios selected from the group consisting of: a printing scenario for performing a print job by printing at least a portion of a document with a first printer and printing at least another portion of the document with a second printer; a printing scenario for performing the print job using a third printer but not being able to complete the print job for a specified period of time; and a printing scenario for performing the print job using a fourth printer located at a certain distance from the user.

9. The computer-readable medium as recited in claim 8, wherein the notification message is selected from the group consisting of an email message, a pop-up window, an instant message, a page, and a telephone call.

10. The computer-readable medium as recited in claim 8, wherein the automated selection service module receives a confirmation of one printer of the at least one selected destination printer prior to transmitting the print data request.

11. The computer-readable medium as recited in claim 8, wherein the automated selection service module analyzes the printer-related data in accordance with a prioritization list.

12. The computer-readable medium as recited in claim 8, wherein the automated selection service module requests user input, and wherein the automated selection service module uses the user input during the analysis.

13. A method for routing a print data request in a network printing system, the method comprising:
  receiving the print data request by at least one processor via a network connection from a computer terminal;
  analyzing printer-related data corresponding to each of a plurality of network printers comprising the steps of:
    determining a group consisting of at least one prospective network printer from the plurality of network printers in accordance with a first analysis using at least a portion of the printer-related data;
    attempting to select at least one of the plurality of printers from the group of the at least one prospective network printer in accordance with a second analysis using at least another portion of the printer-related data different from the portion of the printer-related data used for the first analysis, and
    determining if at least one of the plurality of network printers was automatically selected as at least one network printer in accordance with the first and second analysis;
  and
  routing the print data request to the at least one selected network printer of the plurality of network printers if an automatic selection of the at least one network printer has been made;
  wherein analyzing comprises analyzing at least one of a fixed characteristics and time varying characteristics for each of the plurality of network printers,
  wherein the fixed characteristics are cost per page and one of toner colorants and halftone screens used during the first analysis,
  wherein the time varying characteristics are one of color gamut and tone reproduction curve used during the second analysis, and
  proposing at least two printing scenarios and requesting a user to select one of the at least two printing scenarios,
  wherein the at least two printing scenarios include at least two printing scenarios selected from the group consisting of: a printing scenario for performing a print job by printing at least a portion of a document with a first printer and printing at least another portion of the document with a second printer; a printing scenario for performing the print job using a third printer but not being able to complete the print job for a specified period of time; and a printing scenario for performing the print job using a fourth printer located at a certain distance from the user.

14. The method for routing print data in a network printing system according to claim 13, further comprising generating and transmitting a notification message to the computer terminal specifying the at least one selected network printer.

15. The method for routing print data in a network printing system according to claim 14, further comprising analyzing the printer-related data in accordance with a prioritization list.

* * * * *